(12) United States Patent
Duga

(10) Patent No.: US 10,282,162 B2
(45) Date of Patent: May 7, 2019

(54) AUDIO BOOK SMART PAUSE

(71) Applicant: Google Inc., Mountain View, CA (US)

(72) Inventor: Brady Duga, Carlsbad, CA (US)

(73) Assignee: Google LLC, Mountain View, CA (US)

( * ) Notice: Subject to any disclaimer, the term of this patent is extended or adjusted under 35 U.S.C. 154(b) by 303 days.

(21) Appl. No.: 15/169,374

(22) Filed: May 31, 2016

(65) Prior Publication Data

US 2016/0274862 A1 Sep. 22, 2016

Related U.S. Application Data

(63) Continuation of application No. 14/108,908, filed on Dec. 17, 2013, now Pat. No. 9,378,651.

(51) Int. Cl.
| | | |
|---|---|---|
| *G06F 17/00* | (2006.01) | |
| *G06F 3/16* | (2006.01) | |
| *G09B 19/04* | (2006.01) | |
| *G09B 5/06* | (2006.01) | |
| *B42D 9/00* | (2006.01) | |
| *G06F 17/30* | (2006.01) | |

(Continued)

(52) U.S. Cl.
CPC .......... *G06F 3/165* (2013.01); *B42D 9/007* (2013.01); *G06F 15/0291* (2013.01); *G06F 17/30044* (2013.01); *G06F 17/3074* (2013.01); *G06F 17/30752* (2013.01); *G09B 5/062* (2013.01); *G09B 19/04* (2013.01); *G10L 15/26* (2013.01)

(58) Field of Classification Search
CPC .......... G06F 3/165; G06F 17/30044; G06F 17/3074; G06F 17/30752; G06F 15/0291; G09B 19/04; G09B 5/062; G10L 15/26; B42D 9/007

USPC .......................................................... 700/94
See application file for complete search history.

(56) References Cited

U.S. PATENT DOCUMENTS

| | | | |
|---|---|---|---|
| 8,644,971 B2 * | 2/2014 | Weinstein ........ | H04N 21/44213 700/94 |
| 8,972,265 B1 * | 3/2015 | Lester ..................... | G10L 13/00 704/246 |

(Continued)

FOREIGN PATENT DOCUMENTS

WO   WO 2012/091731 A2   7/2012

OTHER PUBLICATIONS

"EPUB Media Overlays 3.0," International Digital Publishing Forum, Oct. 11, 2011, 39 Pages, [online] [Retrieved on Oct. 30, 2013] Retrieved from the internet <URL:http://www.idpf.org/epub/30/spec/epub30-mediaoverlays.html>.

*Primary Examiner* — Paul C McCord
(74) *Attorney, Agent, or Firm* — Shumaker & Sieffert, P.A.

(57) ABSTRACT

A user device that plays back audio books for a user can include a dynamic pause that provides a user with greater flexibility in when to pause playback of an audio book. Dynamic pause includes initiating playback of an audio book using a user device; receiving a pause request as input to the user device, the pause request received at an input time index during playback of the audio book; retrieving a subset of candidate pause points, each candidate pause point comprising a time index within the audio book that corresponds to a break point located within an eBook corresponding to the audio book; selecting one of the candidate pause points from the subset, the time index of the selected candidate pause point determining a pause time index when playback is to be paused; and pausing the playback at the pause time index.

17 Claims, 6 Drawing Sheets

(51) Int. Cl.
*G06F 15/02* (2006.01)
*G10L 15/26* (2006.01)

(56) References Cited

U.S. PATENT DOCUMENTS

| | | | |
|---|---|---|---|
| 9,055,115 B2 * | 6/2015 | Bell | H04L 67/22 |
| 9,378,651 B2 | 6/2016 | Duga | |
| 2002/0163533 A1 | 11/2002 | Trovato et al. | |
| 2007/0098351 A1 | 5/2007 | East et al. | |
| 2007/0258704 A1 * | 11/2007 | Kobrin | G11B 15/087 |
| | | | 386/241 |
| 2007/0266410 A1 * | 11/2007 | Balfanz | G11B 27/105 |
| | | | 725/88 |
| 2008/0295040 A1 * | 11/2008 | Crinon | H04N 7/152 |
| | | | 715/865 |
| 2011/0289506 A1 * | 11/2011 | Trivi | G06F 9/526 |
| | | | 718/104 |
| 2012/0030704 A1 | 2/2012 | Schiller et al. | |
| 2012/0206472 A1 * | 8/2012 | Kandekar | G06Q 30/0214 |
| | | | 345/581 |
| 2013/0145265 A1 * | 6/2013 | Cunningham | G06F 3/165 |
| | | | 715/716 |
| 2013/0159853 A1 * | 6/2013 | Story, Jr. | G06F 3/165 |
| | | | 715/716 |
| 2014/0005814 A1 * | 1/2014 | Hwang | G11B 27/005 |
| | | | 700/94 |
| 2014/0040713 A1 * | 2/2014 | Dzik | G10L 15/26 |
| | | | 715/203 |
| 2014/0046661 A1 * | 2/2014 | Bruner | H04N 21/4884 |
| | | | 704/235 |
| 2014/0258858 A1 * | 9/2014 | Hwang | G09B 5/062 |
| | | | 715/716 |
| 2015/0011251 A1 * | 1/2015 | Parker | H04W 4/14 |
| | | | 455/466 |
| 2016/0274862 A1 | 9/2016 | Duga | |

* cited by examiner

AUDIO BOOK SMART PAUSE

CROSS-REFERENCED APPLICATIONS

This application is a continuation of U.S. application Ser. No. 14/108,908, filed on Dec. 17, 2013, which is incorporated by reference in its entirety.

TECHNICAL FIELD

This disclosure generally relates to the audio books, and in particular to playback and pausing in audio books.

BACKGROUND

When listening to an audio book it is often difficult to determine when to press the stop or pause button. Generally a user may want to do this at a time index in the audio book corresponding to logical stopping points given the written structure of the book. However, such logical stopping points are often not obvious from the audio book itself. Often in an audio book the speaker will not pause at logical stopping points, or will continue speaking through a logical stopping point, or will pause at unexpected stopping points instead. Existing techniques for addressing this problem involve listening ahead, at which point it is too late to pause. This problem is particularly pronounced when the audio book includes a voice actor performing a dramatic reading of the content.

SUMMARY OF THE INVENTION

A user device that plays back audio books for a user can include a dynamic pause that provides a user with greater flexibility in when to pause playback of an audio book. In one embodiment, dynamic pause includes initiating playback of an audio book using a user device; receiving a pause request as input to the user device, the pause request received at an input time index during playback of the audio book; retrieving a subset of candidate pause points, each candidate pause point comprising a time index within the audio book that corresponds to a break point located within an eBook corresponding to the audio book; selecting one of the candidate pause points from the subset, the time index of the selected candidate pause point determining a pause time index when playback is to be paused; and pausing the playback at the pause time index.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

System Environment

Figure 1:
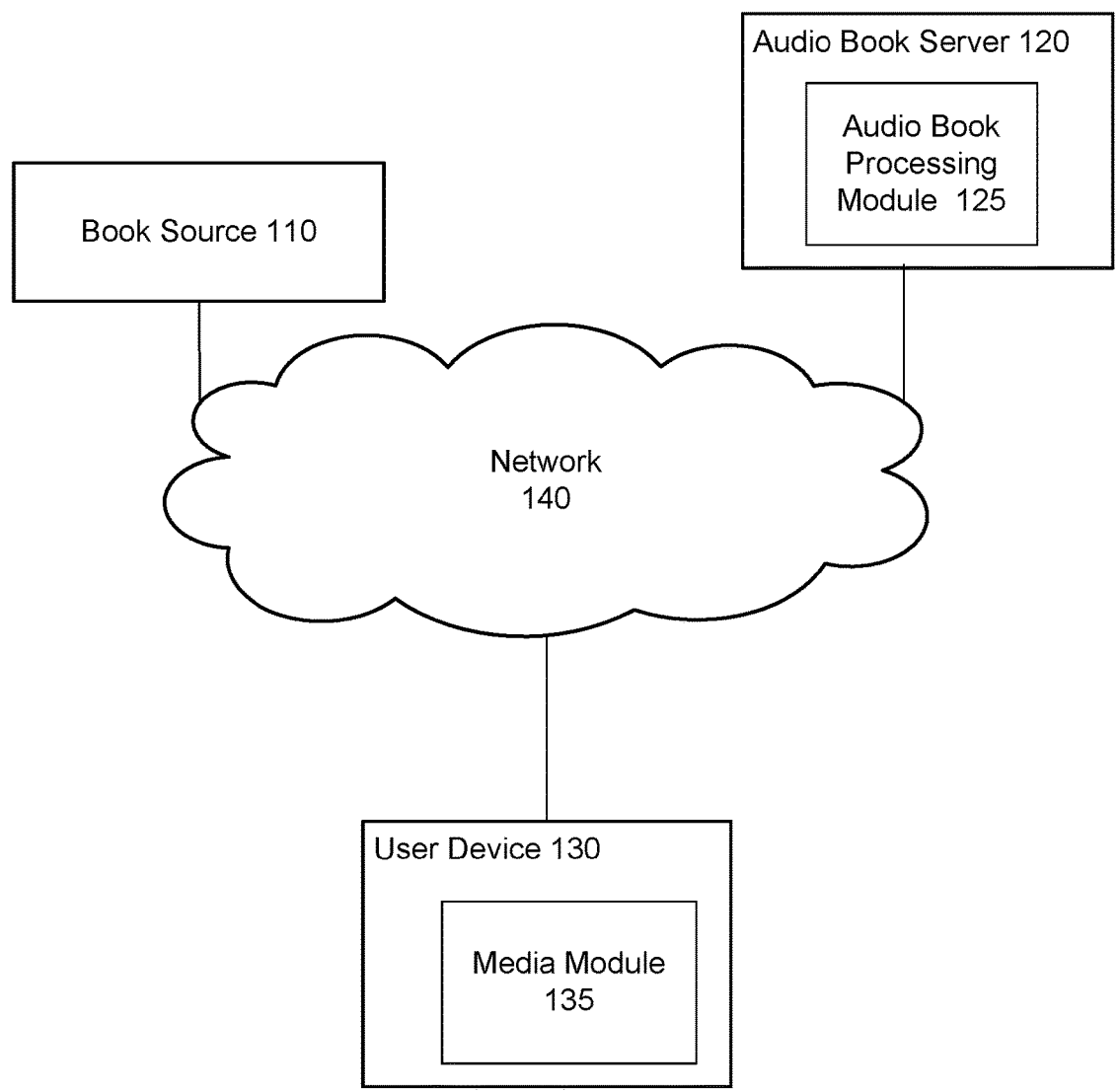
FIG. 1 is a high-level block diagram of a computing environment according to one embodiment of the invention.

FIG. 1 is a high-level block diagram that illustrates a computing environment according to one embodiment of the invention. The computing environment 100 includes a book source 110, an audio book server 120, and a user device 130 coupled through a network 140. For clarity, FIG. 1 illustrates only a single book source 110, audio book server 120, and user device 130, but those of skill in the art will recognize that multiple instances of each of these may be present.

The book source 110 is a computer system configured to store and transmit machine readable data representing a book. The book may stored and transmitted in one or more formats: an audio format (e.g., an audio book), a text type format (e.g. an eBook), and a combined format including both audio and text. An example combined format is the EPUB format. Examples of audio book formats include: include MP3, WINDOWS MEDIA AUDIO (WMA), and ADVANCED AUDIO CODING (AAC). Examples of eBook formats include HTML and PORTABLE DOCUMENT FORMAT (PDF). The exact format used may vary by implementation. Although not shown, the book source 110 may be split between two separate computing systems including an audio book source that provides audio books, and a eBook source that provides eBooks.

The audio book server 120 is configured to retrieve the eBook and audio book from the book source 110, where the eBook and the audio book both have the same raw text. The audio book server 120 includes an audio book processing module 125 that processes the audio book and eBook to identify candidate pause points in the audio book based on break points present in the eBook. More specifically, the audio book processing module 125 uses the raw text of eBook (e.g., punctuation) as well as formatting demarcation in the eBook (e.g., chapter breaks) to identify locations of break points in the eBook. Each break point has a type (e.g., sentence end, paragraph end, chapter end).

Further, the audio book processing module 125 performs speech-to-text recognition on the audio book to correlate time indices in the audio book with the raw text of the book. Alternatively, the time indices and raw text may be received as part of the audio book itself. For example if the audio book and eBook are combined in EPUB format, the raw text may be included in the EPUB data along with the time indices in a Media Overlay format. The audio book processing module 125 then correlates the time indices from the audio book with the locations of break points from the eBook to generate the candidate pause points. Each candidate pause point includes at least a time index in the audio book that corresponds to a location of a break point in the eBook. The candidate pause points may also be assigned scores based on the type of break point. The audio book server 120 stores the candidate pause points.

The user device 130 is a computing device used by users to listen to an audio book. For example, the user device can be a dedicated audio book player, or another general or specific-purpose computing device such as a mobile telephone, tablet, notebook, or desktop computer. The user device 130 includes a media module 135 to play back the audio book. The media module 135 can be a standalone application or integrated into operating systems, web browsers or other software executing on the computing device. The media module 135 is also configured to retrieve audio books and their associated candidate pause points from the audio book server 120. In an alternative implementation, the user device 130 retrieves the audio from the book source 110 and the candidate pause points from the audio book server 120.

The media module 135 includes a smart pause that can be activated by the user at any point during playback of an audio book. When the smart pause is activated at a input time index within the audio book, the media module 135 identifies a subset of candidate pause points and selects one as suitable. The mechanism for selecting which candidate pause point is most suitable may vary in different implementations, and may depend on the user's preferences. Using the time index of the selected candidate pause point as a pause time index, audio book playback continues until the pause time index is reached, whereupon playback is paused. When playback is resumed, it resumes following the pause time index. In an alternate embodiment where the pause time index may be before the input time index, playback is paused immediately and playback resumes from the pause time index. Thus, because the time indices of candidate pause points correspond to locations of break points in the eBook, smart pause provides pause functionality that pauses playback in manner similar to how a book is actually read by a human reader.

The network 140 is typically the Internet, but can be any network, including but not limited to any combination of a LAN, a MAN, a WAN, a mobile, a wired or wireless network, a private network, or a virtual private network. The audio book server 120 and user device 130 are connected to the network 140 through network interfaces.

Computer Architecture

Figure 2:
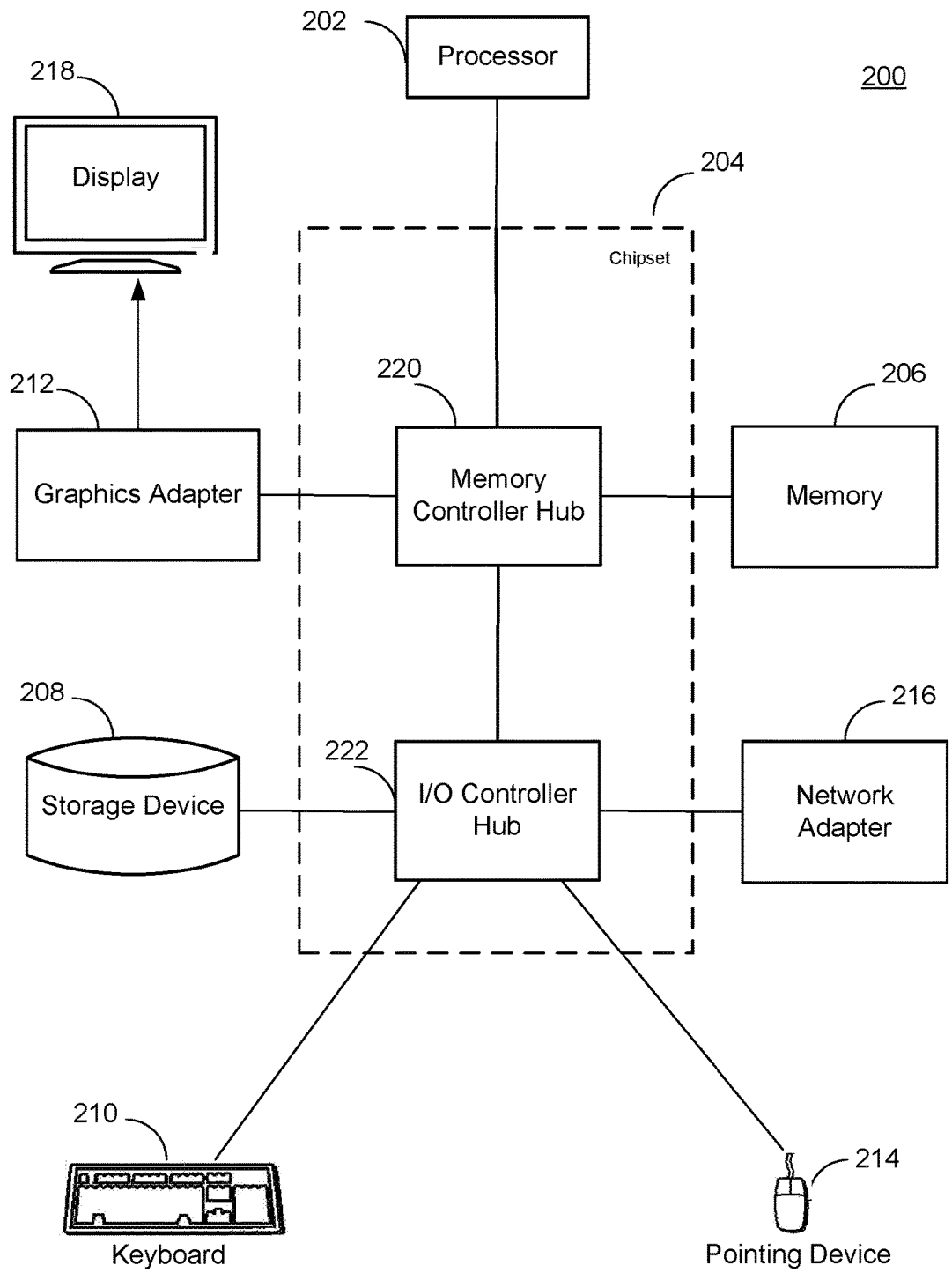
FIG. 2 is a high-level block diagram illustrating an example of a computer for use in the computing environment shown in FIG. 1 according to one embodiment of the invention.

The entities shown in FIG. 1 are implemented using one or more computers. FIG. 2 is a high-level block diagram illustrating an example computer 200. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computer 200 have different architectures.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display 218. The network adapter 216 couples the computer system 200 to one or more computer networks.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computers 200 used by the entities of FIG. 1 can vary depending upon the embodiment and the processing power required by the entity. For example, the audio book server 120 might include multiple blade servers working together to provide the functionality described herein, whereas the user device 130 might include a smartphone or portable media player configured to provide the functionality described herein. The computers 200 can lack some of the components described above, such as keyboards 210, graphics adapters 212, and displays 218.

Example Architectural Overview of the Audio Book Server

Figure 3:
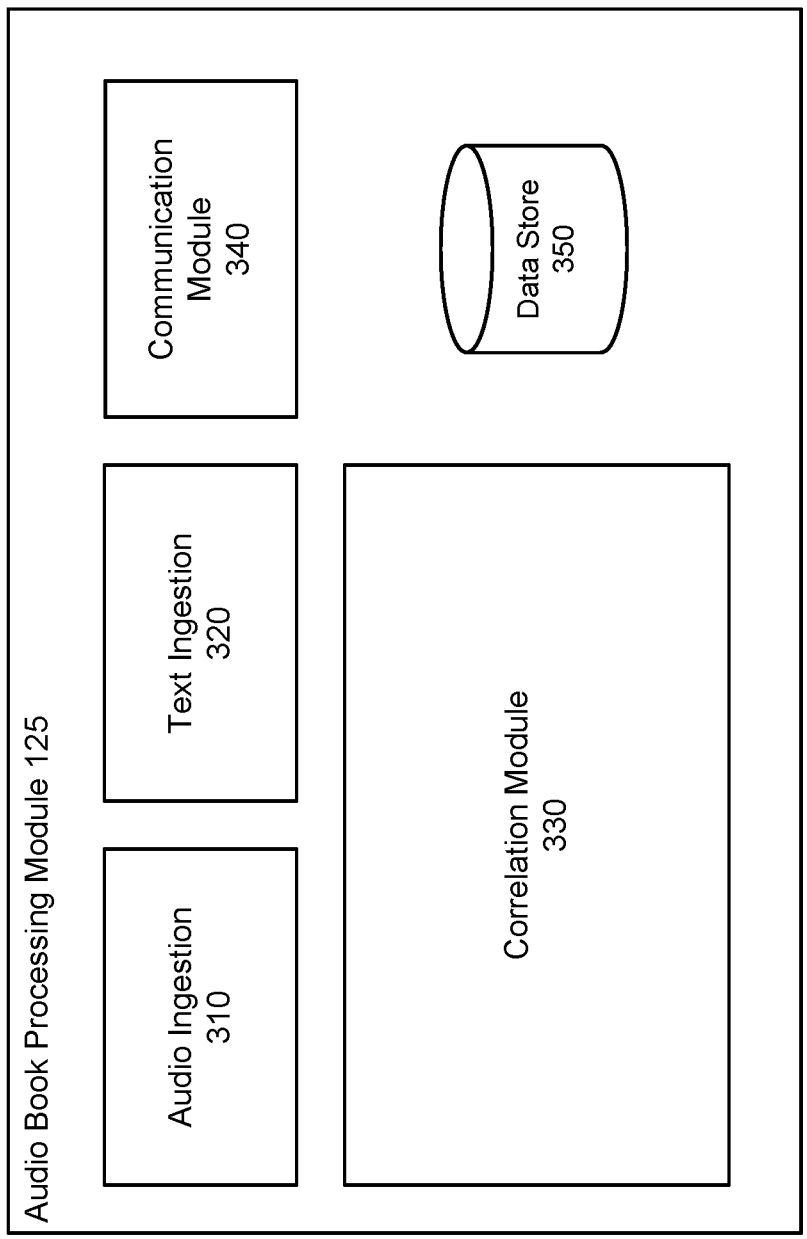
FIG. 3 is a high-level block diagram illustrating an audio book processing module within an audio book server shown in FIG. 1 according to one embodiment of the invention.

FIG. 3 is a high-level block diagram illustrating an audio book processing module 125 within an audio book server 120. Some embodiments of the module 125 have different and/or other modules than those described herein. Similarly, the functions can be distributed among the modules in accordance with other embodiments in a different manner than is described herein. As shown, the module 125 includes an audio ingestion module 310, a text ingestion module 320, a correlation module 330, a communication module 340, and a data store 350.

The audio ingestion module 310 ingests an audio book from the book source 110. The audio book is stored in data store 350, and is associated with the corresponding eBook also associated with the same underlying book. The audio ingestion module 310 may also perform speech-to-text recognition on the audio book to generate a speech-to-text version of the raw text of the underlying book. Using speech-to-text recognition, the audio ingestion module 310 correlates time indices in the audio book with locations in the speech-to-text version of the raw text. The speech-to-text version of the raw text and time index to location correlations are stored in the data store 350. Alternatively, if the audio book is received in a combined format with the eBook, the raw text is included in the eBook and thus can be stored in data store 350 directly. The combined format may also include the time indices, for example in a Media Overlay format if the combined format is EPUB, which may also be directly stored in data store 350.

The text ingestion module 320 ingests the eBook from the book source 110. The eBook is also stored in the data store 350, and is associated with the audio book also associated with the same underlying book. The text ingestion also performs image-to-text recognition (e.g., optical character recognition) in cases where the ingested eBook is in image format rather than in a machine readable format. The image-to-text recognition recognizes both the raw text of the eBook as well as the formatting demarcations that describe how the raw text is presented in the eBook. The image-to-text recognized version of the eBook is also stored in the data store 350.

In one embodiment, the audio 310 and text 320 ingestion modules can be configured to retrieve the audio and text formats of the book simultaneously, possibly together in a single data construct (e.g., an EPUB eBook having a corresponding audio track).

The correlation module 330 processes the audio book and eBook to identify candidate pause points in the audio format of the book based on break points present in the text format of the book. More specifically, this includes 1) identifying locations of break points in the text format of the book and 2) generating candidate pause points by correlating the locations of the break points in the eBook with the time indices from the speech-to-text version of the raw text. The candidate pause points are stored in the data store 350.

The correlation module 330 parses the eBook to extract the break points and their locations within the eBook. Break points are present in the eBook either as raw text or as formatting demarcations that affect how the raw text appears in the eBook. Examples of raw text break points include punctuation marks such as periods ("."), exclamation points ("!"), and question marks ("?"). Formatting demarcations generally adhere to a set of rules, such as a specification or standard, that both identifies them as not being raw text and also indicates what each of the formatting demarcation means. For example, in EPUB the demarcation <div> represents a paragraph or section, and other markups exist for chapter beginnings, headings, lists, tables, page breaks, changes in font, font size, font format, blank pages, etc.

When the correlation module 330 identifies a break point in the eBook, the location of the break point in the raw text of the eBook is stored in a list in data store 350, along with the type of the break point (e.g., paragraph ending, new chapter, font change, etc.).

The correlation module 330 correlates the locations of the break points in the eBook with a corresponding location in the raw text from the speech-to-text version of the audio book. Generally, these locations will match up and be identical. However depending upon the quality of the audio book and the quality of the speech-to-text recognition, the correlation module may perform some adjustments in order to synchronize the locations from the eBook with the locations in the speech-to-text version of the audio book.

The correlation module 330 further correlates the locations of the break points in the speech-to-text version of the audio book with the time indices corresponding to those locations. The correlation module 330 generates a candidate pause point for each break location in the eBook and the corresponding time index from the audio book. Each candidate pause point may also include the type of each break point. The correlation module 330 stores the candidate pause points as a set in data store 350. In an alternative embodiment, the correlations described above may be performed by comparing the eBook to the speech-to-text version of the audio book, rather than using a separate break point list.

The correlation module 330 may also assign a score to each candidate pause point in the set based on the type of break point. The score is also stored in data store 350. The score represents the "importance" of that type of break point relative to other types of break points. Importance, generally, is a measure of how "big" of a break the type of break point is, from the point of view of a hypothetical reader or listener who is reading or listening to the book, respectively. Generally, book readers consider the end of a sentence to be a break point at which they could stop reading, as the end of a sentence represents the end of a thought. However the end of a sentence is generally less final (less "big" or "important") than the end of a paragraph, which represents the end of a series of thoughts, and so on for section breaks, page breaks, header breaks, and chapter breaks. Generally, readers of text books and listeners to audio books prefer to stop reading or listening at "bigger" breaks versus "smaller" breaks. Assigning different scores to different types of break points allows for codification of the differences between types of break points.

The communication module 340 is an externally facing module configured to communicate with the user device 130. Generally, the communication module 340 provides at least the set of candidate pause points for the book, and may also provide the audio book.

Example Architectural Overview of the Media Module

Figure 4:
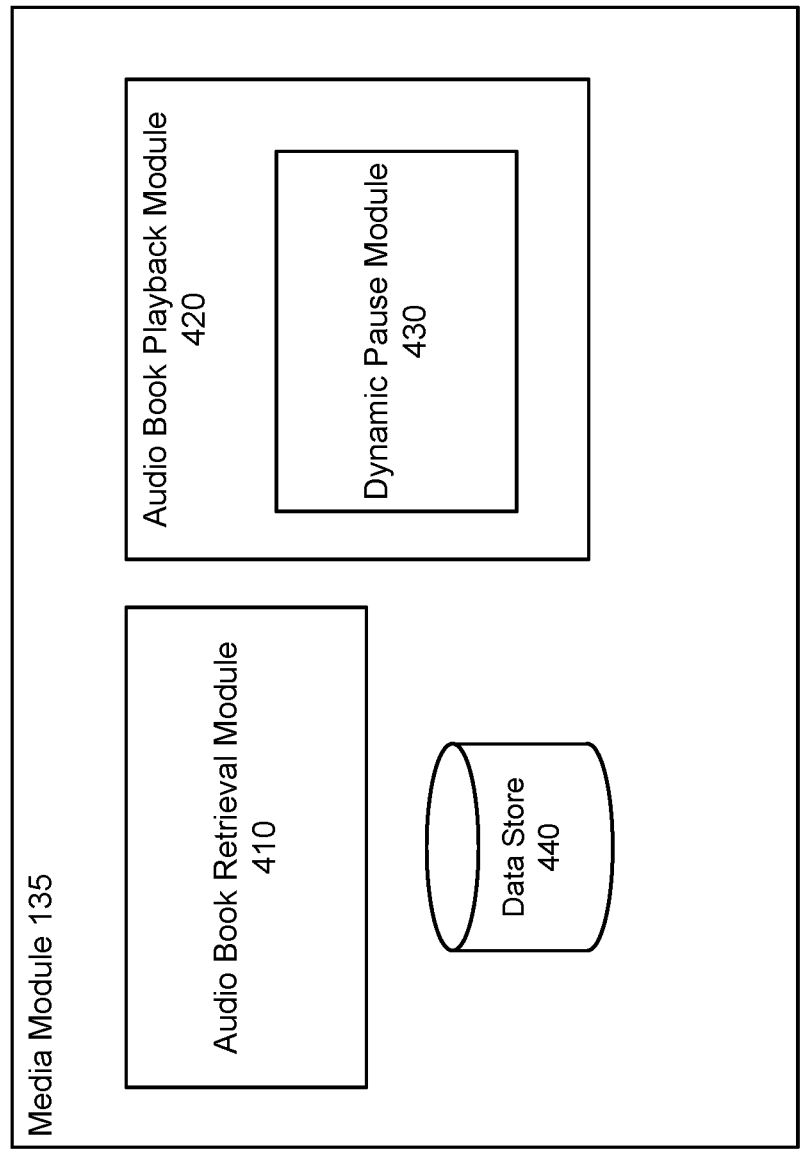
FIG. 4 is a high-level block diagram illustrating a media module within a client device shown in FIG. 1 according to one embodiment of the invention.

FIG. 4 is a high-level block diagram illustrating a media module 135 within a client device 130. Some embodiments of the media module 135 have different and/or other modules than those described herein. Similarly, the functions can be distributed among the modules in accordance with other embodiments in a different manner than is described herein. As shown, the media module 135 includes an audio book retrieval module 410, an audio playback module 420, a dynamic pause module 430, and a data store 440.

The audio book retrieval module 410 obtains the audio book from either the communication module 340 of the audio book server 120, or from the book source 110 directly. In receiving the audio book, the audio book retrieval module 410 retrieves the set of candidate pause points from the audio book server 120. More specifically, the audio book retrieval module 410 retrieves at least the time indices of the candidate pause points of the retrieved audio book, and one or more of the scores of each candidate pause point, the type of each break point, and the location of each break point in the corresponding eBook. The audio book and the candidate pause points are stored in the data store 440.

The audio book playback module 420 is configured to control playback of the audio book through an audio output associated with the user device 130. The playback module 420 is associated with an interface (not shown) that allows the user to control playback of the audio book. Example functionality of the interface includes start, stop, resume, volume control, time index selection so the user can transition quickly to a different point in the audio book, an immediate pause that pauses the playback immediately, and a dynamic pause that is further described below.

The playback module 420 includes a dynamic pause module 430 that provides the functionality for the dynamic pause in the interface. Generally, dynamic pause pauses playback of the audio book at a pause time index after input through the interface. The length of time between the input time index when the dynamic pause input is received, and the pause time index when playback is paused is based on the input time index, a subset of the candidate pause points, and a prioritization function. The prioritization function uses the input time index and the candidate pause points to select a single candidate pause point whose time index is used as the pause time index.

In selecting the candidate pause point used to pause playback, the dynamic pause module 430 generally only considers the subset of candidate pause points following the input time index. There are a number of ways to identify this subset. The subset can simply be all candidate pause points following the input time index, however this can be inefficient if the set is large. Alternatively, the dynamic pause module 430 identifies the subset by considering the next N candidate pause points to occur by time index, where N is a fixed or variable number. Alternatively, the dynamic pause module 430 considers all candidate pause points that have a time index with a threshold amount of time to the input time index. In one embodiment, the candidate pause points used in the subset is configurable by the user via the interface In order to select one of the candidate pause points in the subset to determine the pause time index, the prioritization function determines a pause score for each of the candidate pause points in the subset. The dynamic pause module 430 selects the candidate pause point with the highest pause score for use in determining the pause time index.

The prioritization function assumes that a listener would prefer that playback be paused at a time corresponding to when a break point occurs in the text version of the book. Generally, the prioritization function assumes that a listener would prefer that playback sooner in time rather than later in time. Generally, the prioritization function also assume that a listener would prefer that playback be paused at a "bigger" and/or more "important" break point everything else being equal (e.g., end of a chapter vs. the end of a sentence). However, as most break points will be separated in time from each other, the prioritization function is configured to account for both of these competing concerns in creating the pause scores. To provide the user with more control over the dynamic pause, in one embodiment the exact parameters of the prioritization function can be adjusted by the user through preferences controllable in the user interface.

In situations in which the systems discussed here collect personal information about users, or may make use of personal information, the users may be provided with an opportunity to control whether programs or features collect user information (e.g., information about a user's reading preferences), or to control whether and/or how to receive content from the audio book server 120 or book source 110 that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the audio book server 120 and book source 110.

In one embodiment, the dynamic pause module 430 determines the pause score for a candidate pause point by processing the type score of the candidate pause point and the difference in time between the input time index and the time index of the candidate pause point with the prioritization function. An example prioritization function is as follows:

$$ps = a(ts)/2^{b|t|}$$

where ps is the pause score, ts is a type score of the candidate pause point, |t| is a time contribution representing the magnitude of the difference in time between the input time index and the time index of the candidate pause point, and a and b are configurable parameters. Other functions are also envisioned as being within the scope of the present description.

Continuing with the example, assume an example audio book and an example implementation of the dynamic pause module 430 where a and b in the above function are 1, ts for sentence end is 1, and ts for a paragraph end is 5. Assume the input time index is at 500 seconds, and that there are four break points in the subset under consideration. The point scores for the candidate pause points are as presented in Table 1 below:

TABLE 1

| Candidate Pause Points | Break Point Type | Time Index | Pause Score |
|---|---|---|---|
| 1 | Sentence End | 502 | 0.25 |
| 2 | Paragraph End | 504 | 0.3125 |
| 3 | Sentence End | 506 | 0.015625 |
| 4 | Paragraph End | 508 | 0.01953125 |

In the example above, candidate pause point 2 has a higher pause score owing to the relative importance of a paragraph end as a break point relative to an end of sentence break point type, despite occurring after candidate pause point 2. In this example, candidate pause point 2 is selected, so time index 504 will be the pause time index. This example illustrates that the first break point following the input time index is not necessarily selected for determining when to pause playback.

Generally, the candidate pause points and their corresponding time indices and type scores are received from the audio book server 120 through the audio book retrieval module 410 as described above. However, in one embodiment the candidate pause points include the time indices and the types of the break points, but not necessarily the type scores. In this case, the dynamic pause module may contain an internal data store 440 that comprises a list correlating various types of break points with type scores. Maintaining type scores locally in the user device 130, and more specifically the data store 440, allows the dynamic pause module 430 to provide additional configurable preferences for the user to choose which types of break points to take into consideration, and what kind of types scores to give them relative to other types of break points. These preferences may also include control for the prioritization function itself, as well as the parameters that make up that function (e.g., a and b from the example above).

In another embodiment, rather than using the prioritization function, the dynamic pause module selects the first candidate pause point following the input time index to determine the pause time index. In yet another embodiment, given a subset of candidate pause points following the input time index, the candidate pause point with the highest type score is selected regardless how long after the input time index that candidate pause point occurs.

Having selected a candidate pause point, the dynamic pause module 430 is configured to pause playback at time index of the selected candidate pause point. Thus, the pause time index is set to the time index of the selected candidate pause point. Playback then proceeds until the pause time index is received, and then playback is stopped. When input to resume playback is received, playback resumes from a playback time index that is equal to the pause time index.

Pausing playback in this dynamic manner is beneficial because it allows the user to pause playback at a reasonable time index within a short time span without requiring the active attention of the user. This is beneficial in situations where the user is focused on another task, and cannot commit their entire attention to pausing at a reasonable time. For example, if the user is driving, dynamic pause allows them to pause at a reasonable location while providing flexibility to the user regarding when to provide the pause input. Further, dynamic pause decreases user aggravation at trying to find a reasonable location to pause. As the dynamic pause module 430 already knows when the break points are going to occur, no re-listening or backtracking is needed to pause at a break point.

Further, in some cases the dynamic pause module 430 considers candidate pause points having time indices before the input time index. This allows the dynamic pause module to take into account situations where it would be advantageous to backtrack the user slightly. For example, if a new chapter just began and an important break point does not occur soon, backing up playback to the prior break point may facilitate listener comprehension when playback is resumed. In this embodiment, if a candidate pause point is selected that has a time index before the current playback time index, the dynamic pause module 430 pauses playback immediately upon receiving the pause input. In this case, the pause time index is equal to the input pause index. Further, the dynamic pause module 430 also adjusts the playback time index to that of the selected candidate pause point, so that when playback is resumed it resumes from that earlier time index.

Overview of Methodology for the Audio Book Server and User Device

Figure 5:
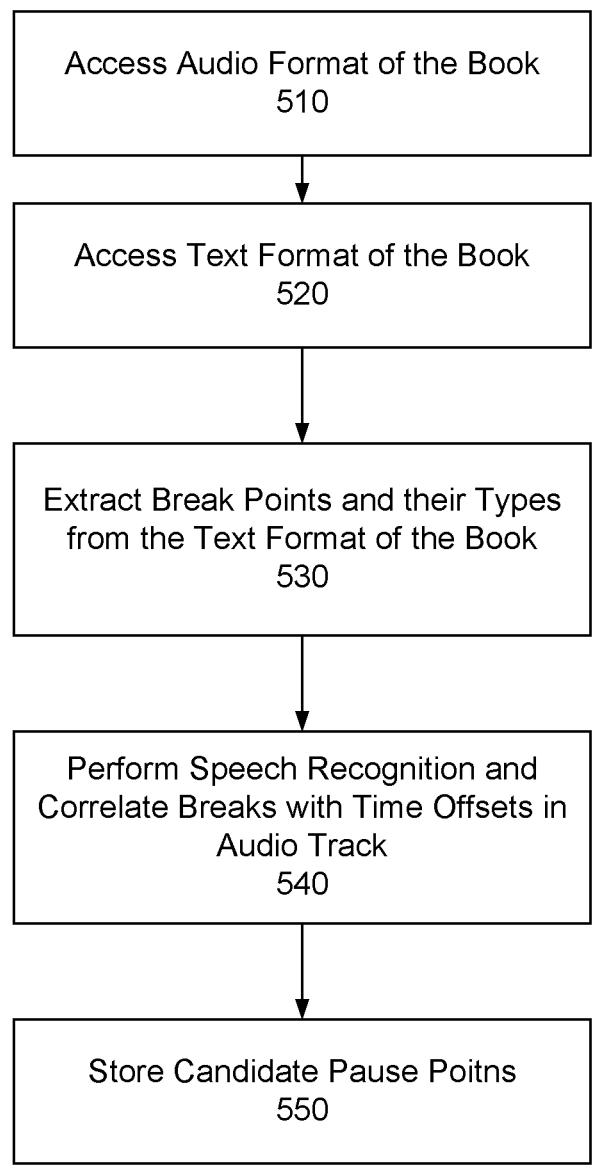
FIG. 5 is a flow diagram illustrating a process for identifying time indices for possible break points within an audio book, according to one embodiment of the invention.

FIG. 5 is a flow diagram illustrating a process for identifying time indices for possible break points within an audio book, according to one embodiment of the invention. Other embodiments can perform the steps of the process 500 in different orders. Moreover, other embodiments can include different and/or additional steps than those described herein.

In step 510, the server 120 accesses the audio format of the book. In step 520, the server accesses the text format of the book. In step 530, the server 120 extracts the break points from the text format of the book, along with the types of those break points. In step 540, the server 120 performs speech to text recognition on the audio format of the book and correlates the time indices of the recognized speech from the audio format with the break points extracted from the text format of the book. This generates a set of candidate pause points identifying break points, their time indices in the audio format of the book, and the type of the break points. The candidate pause points may also include a type score for each candidate pause point. In step 550, the server 120 stores candidate pause points in a data store for convenient access when a user device 130 retrieves at least the candidate pause points if not also the audio format of the book.

Figure 6:
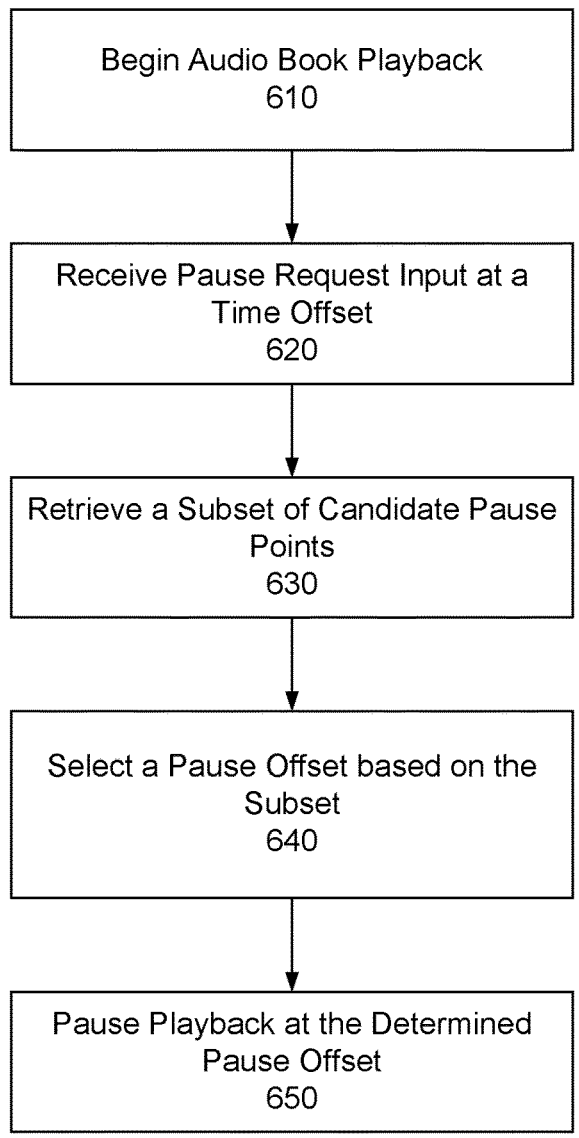
FIG. 6 is a flow diagram illustrating a process for dynamically pausing playback of an audio book, according to one embodiment of the invention.

FIG. 6 is a flow diagram illustrating a process for dynamically pausing playback of an audio book, according to one embodiment of the invention. Other embodiments can perform the steps of the process 600 in different orders. Moreover, other embodiments can include different and/or additional steps than those described herein.

In step 610, the user device 130 begins playback of the audio book. In step 620, the user device 130 receives a dynamic pause input at an input time index requesting that the playback of the audio book be dynamically paused. In step 630, the user device 130 retrieves a subset of the candidate pause points representing possible time indices to pause playback of the audio book. In step 640, the user device 130 selects one of the candidate pause points as the candidate pause point including a pause time index that will be used as the time index when playback is stopped. In step 650, the user device 30 continues playback until the pause time index is reached, and then pauses playback.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for providing dynamic pause for audio books. Thus, while particular embodiments and applications have been illustrated and described, it is to be understood that the present disclosure is not limited to the precise construction and components disclosed herein and that various modifications, changes and variations which will be apparent to those skilled in the art may be made in the arrangement, operation and details of the method, system, and storage medium disclosed herein without departing from the spirit and scope as defined in the appended claims.

What is claimed is:

1. A method comprising:

accessing, by a server, an audio book associated with an eBook that includes text;

generating, by the server, a speech-to-text version of the audio book by at least:

performing speech-to-text recognition on the audio book; and correlating each of a plurality of locations within the text of the eBook to a respective time index in the audio book;

identifying, by the server, a plurality of break points in the eBook, each break point from the plurality of break points corresponding to one of the plurality of locations;

generating, by the server and based on the speech-to-text version of the audio book, a plurality of candidate pause points by at least correlating, for each break point from the plurality of break points, a respective location from the plurality of locations in the eBook of the corresponding break point with one of the respective time indices in the audio book corresponding to the respective location;

receiving, by the server, a request for the plurality of candidate pause points from a user device; and providing, by the server, the plurality of candidate pause points to the user device.

2. The method of claim 1, wherein:

each break point of the plurality of break points includes a type of the break point;

the type of the break point is one of a sentence end, paragraph end, chapter end, or font change; and each candidate pause point of the plurality of candidate pause points includes the type of the break point associated with the candidate pause point.

3. The method of claim 1, further comprising generating an image-to-text version of the eBook by performing image-to-text recognition on an image format of the eBook.

4. The method of claim 1, wherein the audio book and the eBook are stored together in a single data construct.

5. The method of claim 1, wherein identifying the plurality of break points comprises parsing the text of the eBook.

6. The method of claim 1, further comprising assigning a respective score to each of the plurality of candidate pause points, wherein the respective score for each of the plurality of candidate pause points represents an importance of the corresponding candidate pause point.

7. The method of claim 6, wherein each of the respective scores is assigned based on a type of the break point associated with the corresponding candidate pause point.

8. A non-transitory computer-readable storage medium storing executable computer program instructions that, when executed by a processor, cause the processor to:

access an audio book associated with an eBook that includes text;

generate a speech-to-text version of the audio book by at least:

performing speech-to-text recognition on the audio book; and correlating each of the plurality of locations within the text of the eBook to a respective time index in the audio book;

identify a plurality of break points in the eBook, each break point from the plurality of break points corresponding to one of the plurality of locations;

generate, based on the speech-to-text version of the audio book, a plurality of candidate pause points by at least correlating, for each break point from the plurality of break points, a respective location from the plurality of locations in the eBook of the corresponding break point with one of the respective time indices in the audio book corresponding to the respective location;

receive a request for the plurality of candidate pause points from a user device; and provide the plurality of candidate pause points to the user device.

9. The non-transitory computer readable medium of claim 8, wherein:

each break point of the plurality of break points includes a type of the break point;

the type of the break point is one of a sentence end, paragraph end, chapter end, or font change; and each candidate pause point of the plurality of candidate pause points includes the type of the break point associated with the candidate pause point.

10. The non-transitory computer readable medium of claim 8, wherein the computer program instructions further comprise instructions that cause the processor to generate an image-to-text version of the eBook by performing image-to-text recognition on an image format of the eBook.

11. The non-transitory computer readable medium of claim 8, wherein the instructions for identifying the plurality of break points further comprise instructions that cause the processor to parse the text of the eBook.

12. The non-transitory computer readable medium of claim 8, wherein the computer program instructions further comprise instructions that cause the processor to assign a respective score to each of the plurality of candidate pause points, wherein the respective score for each of the plurality of candidate pause points represents an importance of the corresponding candidate pause point.

13. A computer system, comprising:

a processor; and a computer-readable storage medium comprising executable computer program instructions that, when executed, cause the processor to:

access an audio book associated with an eBook that includes text;

generate a speech-to-text version of the audio book by at least:

performing speech-to-text recognition on the audio book; and correlating each of the plurality of locations within the text of the eBook to a respective time index in the audio book;

identify a plurality of break points in the eBook, each break point from the plurality of break points corresponding to one of the plurality of locations;

generate, based on the speech-to-text version of the audio book, a plurality of candidate pause points by at least correlating, for each break point from the plurality of break points, a respective location from the plurality of locations in the eBook of the corresponding break point with one of the respective time indices in the audio book corresponding to the respective location;

receive a request for the plurality of candidate pause points from a user device; and provide the plurality of candidate pause points to the user device.

14. The system of claim 13, wherein:

each break point of the plurality of break points includes a type of the break point;

the type of the break point is one of a sentence end, paragraph end, chapter end, or font change; and each candidate pause point of the plurality of candidate pause points includes the type of the break point associated with the candidate pause point.

15. The system of claim 13, wherein the computer program instructions further comprise instructions that cause the processor to generate an image-to-text version of the eBook by performing image-to-text recognition on an image format of the eBook.

16. The system of claim 13, wherein the instructions for identifying the plurality of break points further comprise instructions that cause the processor to parse the text of the eBook.

17. The system of claim 13, wherein the computer program instructions further comprise instructions that cause the processor to assign a respective score to each of the plurality of candidate pause points, wherein the respective score for each of the plurality of candidate pause points represents an importance of the corresponding candidate pause point.

\* \* \* \* \*